J. McNEIL.
ELLIPSOGRAPH.
APPLICATION FILED JAN. 6, 1919.
1,304,494.
Patented May 20, 1919.
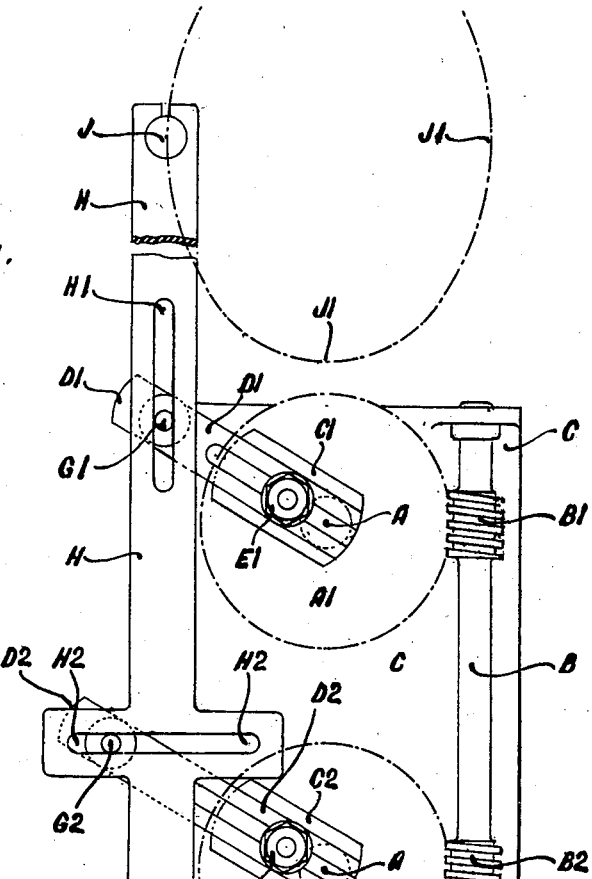
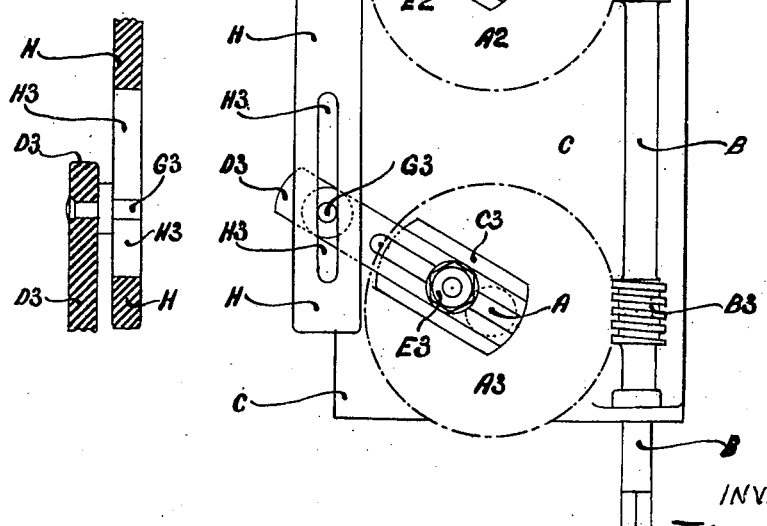
INVENTOR
John McNeil
by Howson and Howson
Attys.

UNITED STATES PATENT OFFICE.

JOHN McNEIL, OF GLASGOW, SCOTLAND.

ELLIPSOGRAPH.

1,304,494.     Specification of Letters Patent.     Patented May 20, 1919.

Application filed January 6, 1919. Serial No. 269,873.

*To all whom it may concern:*

Be it known that I, JOHN MCNEIL, B. A. (*Cantab.*), a subject of the King of Great Britain and Ireland, and a resident of Glasgow, Scotland, have invented certain new and useful Improvements in Ellipsographs, and of which the following is the specification.

The invention has for its object to provide a simple and effective form of instrument or apparatus for describing ellipses of various axial dimensions, and which, while applicable for the usual purposes of such an instrument, is more particularly intended for use in oxy-acetylene plate and slab cutting and electric welding operations with an oxy-acetylene cutting torch or an electrode mounted at the scribing point.

An apparatus made according to the invention comprises essentially a bar-member carrying at one end the scribing point and carrying three guides, two parallel with the bar, and one at right angles thereto. With these guides there engages the pins of cranks the throws of which are variable. The three cranks are interconnected by gearing (toothed wheels, worms, chains, cords or equivalent), so that they move synchronously. If the series of cranks be conjointly rotated, the bar is moved bodily endwise by the pin engaging the guide at right-angles to it and bodily laterally by the pins engaging the guides parallel with it. If the throws of the cranks be equal, the scribing point will of course describe a circle, but if the pin engaging the right-angle guide has the greater throw, then the scribing point will describe an ellipse the major axis of which is parallel with the bar-member, and correspondingly, if it be the pins engaging the parallel guides that be of the greater throw, the major axis of the ellipse will lie at right-angles to the bar. It will be apparent that by varying the throws of the crank pins, ellipses of any proportions within the limits of the capacity of the apparatus may be drawn.

An illustrative example of the apparatus is shown diagrammatically on an accompanying sheet of explanatory drawing, in which Figure 1 is a plan of the apparatus, and Fig. 2 a transverse section of part thereof.

As shown in the drawing, there are provided three wormwheels, $A^1$, $A^2$, $A^3$, mounted on vertical axes A in line with one another, and engaged by worms $B^1$, $B^2$, $B^3$, on a shaft B lying to one side of them. The shaft B is carried in bearings formed for it in a sole plate C, and one end thereof is squared to receive a handle by means of which it may be rotated. The wormwheels carry cranks $C^1$, $C^2$, $C^3$, in radial guides in which are crank arms $D^1$, $D^2$, $D^3$, adjustable as to their radial distance from the axes of the wheels, and held in position by nuts $E^1$, $E^2$, $E^3$, on studs projecting up through grooves in the crank arms. The crank arms bear pins $G^1$, $G^2$, $G^3$. Two of these pins, $G^1$, $G^3$ engage parallel guides $H^1$, $H^3$, on a bar-member H. The third pin $G^2$, which is intermediate to the other two engages a guide $H^2$ at right-angles to the bar H. The bar-member H is supported by the crank arms, and, extending beyond them, has at its scribing end, a socket J to receive an oxy-acetylene cutting torch.

With the parts in the position shown in the drawing, when the three cranks $C^1$, $C^2$, $C^3$, are conjointly rotated through the gearing hereinbefore described, the bar-member H is moved bodily endwise by the crank pin $G^2$, engaged in the guide $H^2$, and at the same time it is moved bodily laterally by the pins $G^1$, $G^3$, engaged in the guides $H^1$, $H^3$, and as the crank pin $G^2$ has the greater throw the scribing point will describe the ellipse $J^1$, the major axis of which is parallel with the bar-member.

It will be apparent that by adjusting the throw of the crank pins, the scribing point may be made to describe either a circle or ellipse of any proportions within the limits of the capacity of the apparatus.

What I claim is:—

1. An improved ellipsograph comprising essentially a guide bar-member, a scribing point moving therewith, three variable throw parallel cranks engaging the bar for guidance thereby, two in a direction parallel with the bar and one in a direction at right angles thereto, and gearing interconnecting and driving the cranks in parallelism.

2. An ellipsograph comprising a bar recessed to afford guideways, two parallel with the bar and one at right angles thereto, three parallel variable throw cranks, pins carried by the cranks and engaging the guide recesses in the bar, gearing interconnecting and driving the cranks in parallelism, and a scribing point moving with the bar.

3. An ellipsograph comprising a bar recessed to afford guideways, two parallel to the bar and one at right angles thereto, three worm wheels on vertical axes in line with one another, a rotatable shaft lying to one side of the worm wheels, worms on the shaft gearing with the worm wheels, cranks carried by the worm wheels and driven in parallelism by the latter, crank arms radially adjustable on the cranks, pins carried by the crank arms and engaging the guides in the bar, and a scribing point moving with the bar, substantially as described.

4. In an ellipsograph, a bar, a scribing point moving therewith, three parallel crank arms in sliding engagement with said bar, two of said crank arms sliding parallel to the length of the bar, and the third at right angles thereto, together with means to rotate said crank arms in unison.

5. In a construction such as specified in claim 4, means for adjusting the length of the several crank arms.

6. In a construction such as specified in claim 4, crank arms mounted on parallel axes spaced apart in the same plane.

In testimony whereof I have signed my name to this specification.

JOHN McNEIL.

Witnesses:
WILFRED HENRY,
JAMES EAGLESOM.